United States Patent [19]
Whitman et al.

[11] Patent Number: 5,402,578
[45] Date of Patent: Apr. 4, 1995

| [54] | APPARATUS AND METHOD OF JOINING A HANDLE SECURING SCREW TO THE TANG OF A KNIFE |
|---|---|
| [75] | Inventors: Robert E. Whitman, Weedsport; Edward S. Hudack, North Syracuse, both of N.Y. |
| [73] | Assignee: Camillus Cutlery Company, Camillus, N.Y. |
| [21] | Appl. No.: 96,376 |
| [22] | Filed: Aug. 30, 1993 |
| [51] | Int. Cl.⁶ .................................................. B25G 3/26 |
| [52] | U.S. Cl. ........................................ 30/344; 30/342; 29/522.1; 29/525.1 |
| [58] | Field of Search .................. 30/340, 342, 343, 344; 81/177.1; 76/104.1, 106; 29/522.1, 525.1 |

[56] References Cited

U.S. PATENT DOCUMENTS

| 51,648 | 12/1865 | Butler | 30/342 |
| 229,219 | 6/1880 | Wilson | 30/344 |
| 495,699 | 4/1893 | Hawks | 30/344 |
| 2,615,247 | 10/1952 | Waters | 30/342 |
| 2,681,505 | 6/1954 | Flanagan | 30/342 |

*Primary Examiner*—Richard K. Seidel
*Assistant Examiner*—Hwei-Siu Payer
*Attorney, Agent, or Firm*—Charles S. McGuire

[57] ABSTRACT

Apparatus and method of attaching a threaded member to the proximal end of a knife tang onto which a securing element is mounted for securing handle pieces about the tang. The head of a prior art screw is flattened and laterally expanded within a complimentary shaped notch extending from an open end into the proximal end of the tang with the threaded end of the screw extending rearwardly therefrom. Once laterally expanded within the notch, the screw is substantially permanently engaged therein.

10 Claims, 4 Drawing Sheets

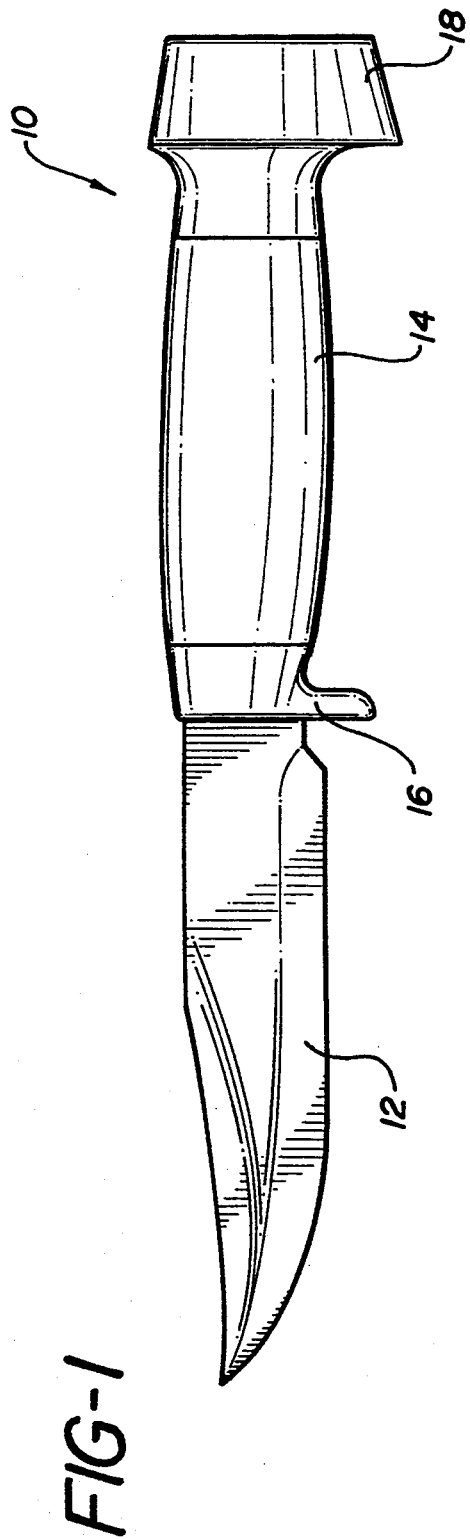
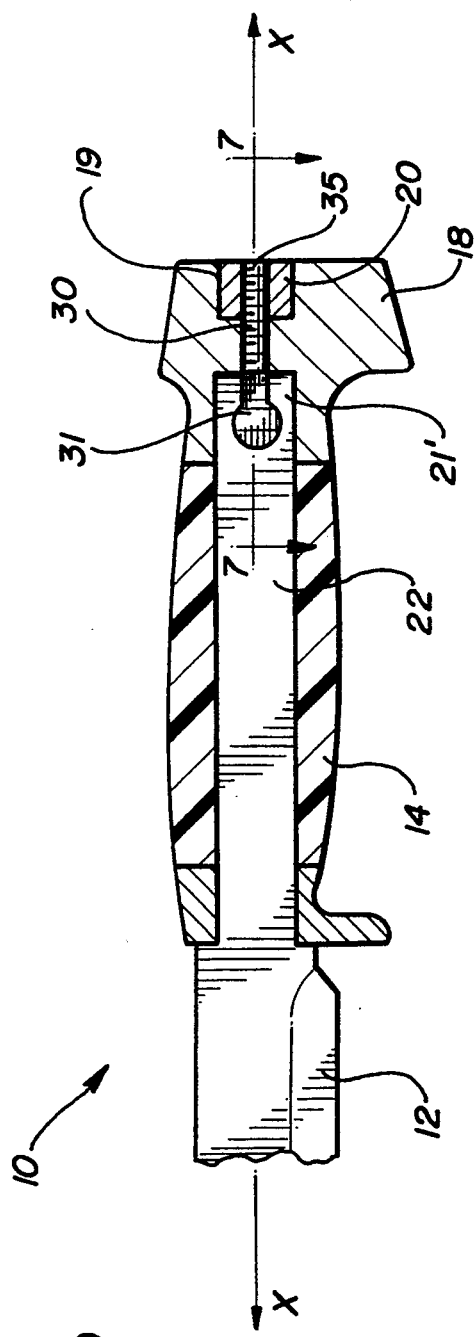

APPARATUS AND METHOD OF JOINING A HANDLE SECURING SCREW TO THE TANG OF A KNIFE

BACKGROUND OF THE INVENTION

This invention relates to knife constructions and, more particularly, to a method of fixedly mounting a threaded member to the end of a blade tang which is used to thread a securing element completing the handle portion of the knife upon the tang.

A typical knife construction of the non-folding type comprises a knife blade formed with a blade tang extending therefrom about which the handle pieces are secured for manually grasping and working the knife. A hilt may be mounted to the tang adjacent the base of the blade with the handle extending rearwardly therefrom. In some models of such knives, the tang extends through the handle and a stylized securing nut is threadedly engaged to a threaded rod extending integrally from or fixedly mounted to and linearly extending from the end of the tang opposite the blade.

In one prior art design and method, a threaded rod is fusibly joined directly to the base of the blade with the handle passed over the rod and a butt piece attached to the threaded portion of the rod extending exteriorly of the handle. See U.S. Pat. No. 3,595,104 issued to Cooper on Jul. 27, 1971.

In another prior art design and method, one end of a length of threaded stock is welded into a notch cut or otherwise formed in the proximal end of the blade tang, and in yet a further prior art design and method, a threaded rod is integrally formed at the end of the tang. Each of the prior known designs and methods are time consuming and expensive to implement. In the Cooper method, the resultant knife is weak at the juncture of the tang and knife blade and may snap under excessive working pressures. Furthermore, it is desirable that the blade and tang portions of the knife be very hard while the threaded portion be soft which would require target heat-treating of the Cooper tang.

The second prior design and method mentioned above is undesirable in that the welding process emits heat which affects both the tang and threaded rod resulting in uneven hardness of both.

The third prior design and method mentioned above would seem the most time-consuming and expensive of the three since the threaded rod must be formed by a tedious grinding operation from an integral projection of the stamped blade and tang.

SUMMARY OF THE INVENTION

It is therefore a principal object of the present invention to provide a method of mounting a threaded rod to the proximal end of a blade tang which requires neither welding nor target heat-treating of the finished piece.

It is another object of the present invention to provide a method of mounting a threaded rod to the proximal end of a blade tang which requires a very limited number of easy to execute manufacturing steps.

It is a further object of the present invention to provide an inexpensive method of mounting a threaded rod to the proximal end of a blade tang for attachment of a handle securing nut.

Still another object is to provide a non-folding knife having separable handle and tang portions with novel and improved structure for releasably securing the handle on the tang.

Yet still another object of the present invention is to provide a method of mounting a threaded rod to the proximal end of a blade tang in which removal and replacement of the threaded rod in the tang is quick and simple should the threaded rod become damaged during subsequent assembly steps.

Other objects will in part be obvious and in part appear hereinafter.

In accordance with the foregoing objects, the invention comprises a method of fixedly mounting a threaded rod to the end of a non-folding knife tang opposite the blade. After the rod is mounted to the tang, handle pieces are passed thereover and positioned about the tang. A butt piece and securing nut are then also passed over the end of the threaded rod extending rearwardly from the tang with the nut threadedly engaging the rod and securing the handle and butt pieces about the tang.

The novel method comprises the steps of positioning a prior art screw having a head portion in a notch cut or otherwise formed in the tang, which notch is shaped complementary to the prior art screw. At least the head of the screw has a diameter greater than the thickness of the tang end and the portions of the screw within the notch are then forcibly flattened by a press or other appropriate tool thereby laterally expanding the screw head in the notch. The screw is thus substantially permanently fixed to the tang yet may be forcibly punched therefrom for replacement of a new screw should the first screw become damaged in any way prior to full assembly of the knife.

The screw which is attached to the tang is "off the shelf" and thus heat-treated, if necessary, prior to the mounting thereof to the separately heat-treated tang, thereby resulting in a tang and threaded rod which are both of the correct hardness.

BRIEF DESCRIPTION OF THE DRAWINGS

FIG. 1 is a side, elevational view of a non-folding knife;

FIG. 2 is a partly cut-away, longitudinal cross-section of the knife of FIG. 1 revealing the screw embedded within the proximal end of the tang and the butt piece and securing nut mounted to the threaded end thereof which extends rearwardly of the tang;

DETAILED DESCRIPTION

Figure 3:
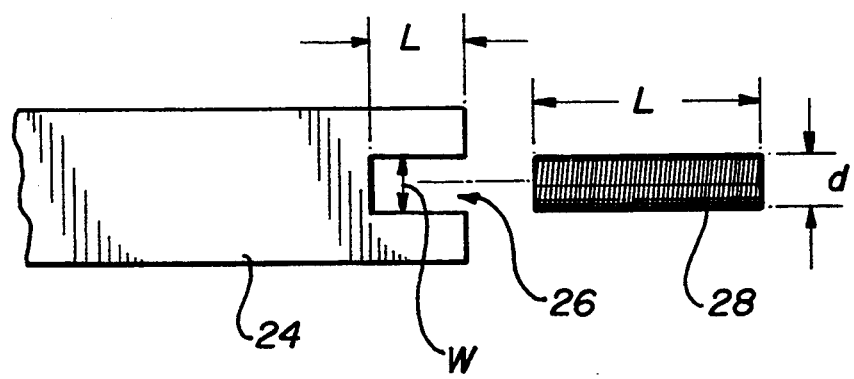
FIG. 3 is a side, elevational view, partly cut-away, of the proximal end portion of a prior art blade tang and a length of threaded stock shown in spaced relation thereto.

Referring now to the drawings, there is seen in FIG. 1 a knife 10 of the non-folding type having a blade 12 and a handle 14. Knife 10 is seen to further include a hilt 16 and a butt piece 18. Hilt 16 is positioned between blade 12 and handle 14 and acts as a guard between the blade 12 and the user's hand (not shown) which manually grasps handle 14 to work knife 10.

As revealed in the longitudinal cross-section of FIG. 2, blade 12 includes an elongated, integral tang 22 of substantially planar, rectangular outline which extends linearly therefrom along a longitudinal axis x—x, through handle 14 and butt piece 18 in the fully assembled condition of knife 10. In a non-folding knife construction such as knife 10, the blade and tang are typically cut or stamped as one integral piece from a suitable, flat stock metal alloy such as stainless or carbon steel, for example. Following initial grinding operations on the blade, the various handle pieces are assembled on the tang. In the design of knife 10, the hilt 16, handle 14 and end piece 18 are formed with apertures extending longitudinally through the piece with the aperture being of substantially the same lateral cross dimensions as tang 22. The individual handle pieces (collective term for all pieces mounted about the tang) are thus mounted upon tang 22 by inserting the terminal end thereof through the apertures in the handle pieces, one at a time. Thus, handle 14 follows mounting of hilt 16 and end piece 18 follows mounting of handle 14 upon tang 22.

To secure the various handle pieces upon the tang, securing means are necessary at the terminal, proximal end of the tang. In this regard, attention is turned to FIGS. 3 and 4 which illustrate prior art methods of attaching a securing means to the terminal end of a tang. The prior art tang 24 of FIG. 3 includes a rectilinear notch 26 cut or otherwise formed at the terminal, proximal end thereof opposite the blade (not shown). An end portion of a length of threaded rod 28 having a maximum diameter "d" slightly less than the width "W" of notch 26 is inserted into notch 26. The length "l" of rod 28 is longer than the length "L" of notch 26 so that a portion of rod 28 extends exteriorly of notch 26 when inserted therein so that a securing nut may be threadedly engaged to the exposed portion of rod 28.

Following insertion of rod 28 into notch 26 as described above, rod 28 is fused therein by welding or other known methods of fusibly joining metals. This method requires still further processing steps in the nature of removing excess solder and flux to permit passage of handle pieces thereover. Also, the heat emitted by the welding process causes both the tang and threaded rod to become unevenly hard.

Figure 4:
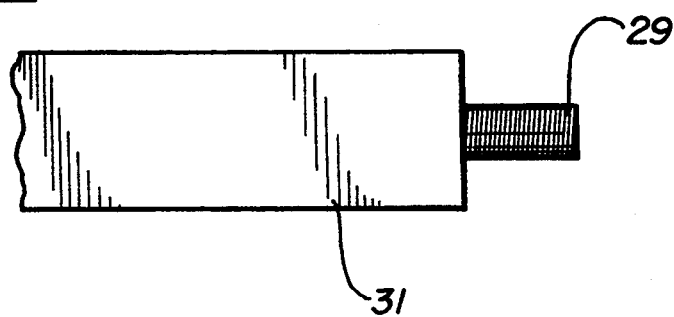
FIG. 4 is side, elevational view, partly cut-away, of another prior art knife tang having a threaded boss integrally formed at the proximal end thereof.

In FIG. 4, the third prior art design and method discussed above forms an integral threaded rod or boss 29 at the terminal, proximal end of the tang 31. This design and method starts with a single piece which includes the blade, tang and boss. This piece is stamped from planar stock and the method therefore involves the labor intensive and time-consuming task of machining the boss 29 into a circular, threaded portion for the threaded engagement of a conventional securing nut thereto.

The present invention overcomes the deficiencies of the prior art methods by providing a method which is much quicker, simpler and less expensive than the prior art methods of FIGS. 3 and 4 and other methods heretofore practiced. Referring again to FIG. 2, a prior art stainless steel screw 30 of the fillister head type is seen mounted to tang 22 with end piece 18 and cylindrical securing nut 20 mounted to the threaded end thereof, with only securing nut 20 being threadedly engaged to screw 30.

Figure 6:
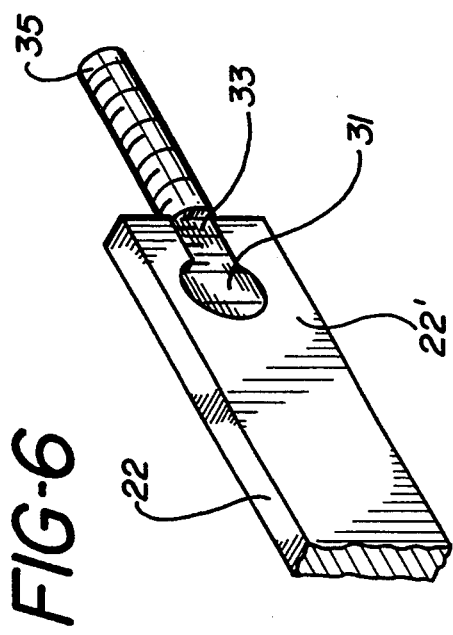
FIG. 6 is the view of FIG. 5 showing the screw permanently engaged in the notch in the tang in the intended manner.
Figure 8:
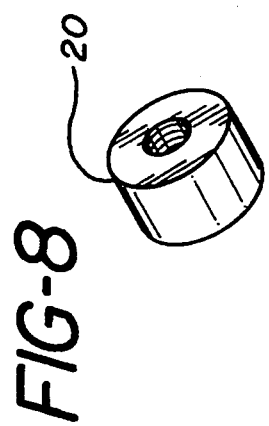
FIG. 8 is a perspective view of the securing nut seen attached to the threaded end of the screw in FIGS. 2 and 7.
Figure 5:
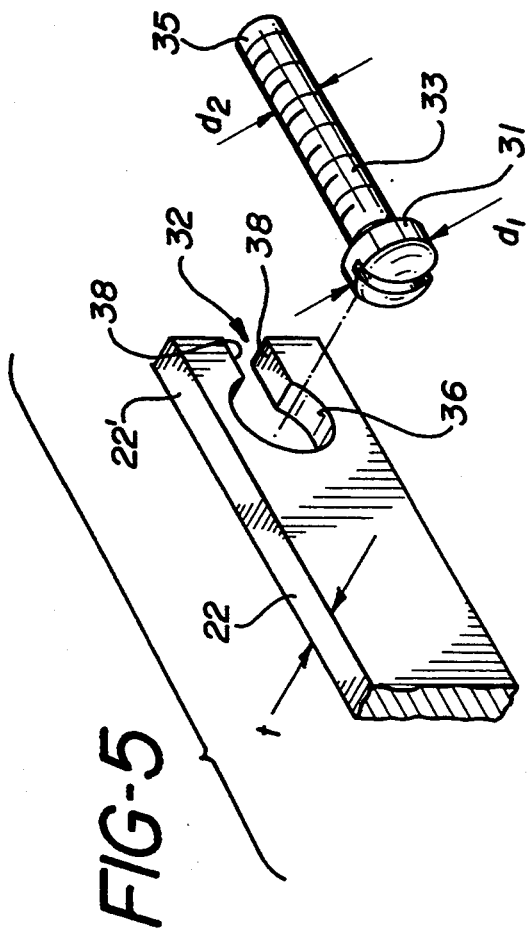
FIG. 5 is a perspective view of the proximal portion of the tang of the inventive knife construction showing a prior art screw in spaced relation thereto.

As seen best in FIGS. 5 and 6, tang 22 includes a notch 32 cut or otherwise formed in the terminal, proximal end 22' thereof which end is located opposite blade 12. Notch 32 lies along longitudinal axis x—x and is cooperatively shaped to the form of head 31 and neck 33 of screw 30 such that notch 32 includes a respective circular portion 36 and linear neck segment 38. The dimensions of circular portion 36 and neck segment 38 are slightly larger than the corresponding dimensions of screw head 31 and neck 33 (having diameter $d_2$) such that screw 30 may be inserted into notch 32 as indicated in FIG. 5.

Figure 7:
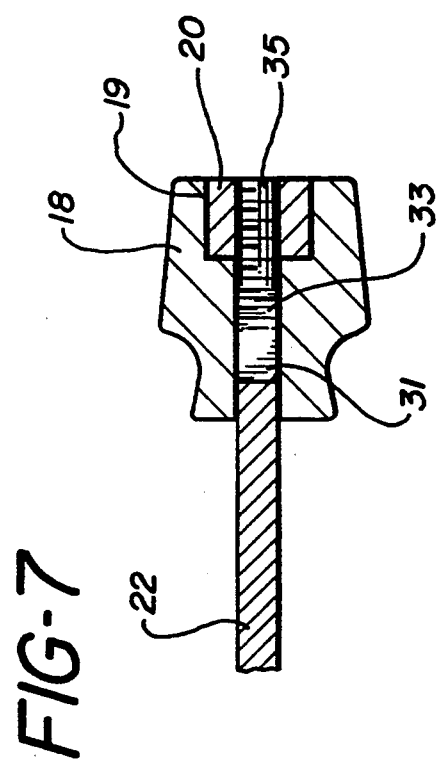
FIG. 7 is a longitudinal, cross-sectional view of the tang with a butt piece secured thereto.

Following insertion of screw 30 into notch 32, a mechanical pressing operation is initiated which deforms the inserted portion of screw 30 into a secure, substantially permanent mounting upon tang 22, as seen in FIGS. 2, 6 and 7. That is to say, at least the head portion of screw 30 within notch 32 has a diameter $d_1$ greater than the thickness t of proximal end 22' of tang 22 which borders the notch. The head 31 of screw 30 is flattened by the pressing operation to a thickness closely approximating thickness t of tang end portion 22'. Consequently, at least the head portion 31 of the screw within notch 32 is laterally expanded to fit tightly within notch 32 thereby substantially permanently affixing screw 30 to tang proximal end portion 22'. The provision of the laterally enlarged head portion 36 of notch 32 and securement of screw head portion 31 therein makes it virtually impossible for screw 30 to unintentionally loosen from notch 32 in a longitudinally rearward direction.

It is noted that should screw 30 become damaged in any way prior to full assembly of knife 10, screw 30 may be easily "punched" or otherwise forcibly removed from notch 32 with no appreciable detrimental affect on tang 22. Thereafter, a new screw 30 may be mounted within notch 32 in accordance with the inventive method. It is obvious that this would not be possible with the threaded portions of the prior art knives without significant damage to the tangs.

Figure 9:
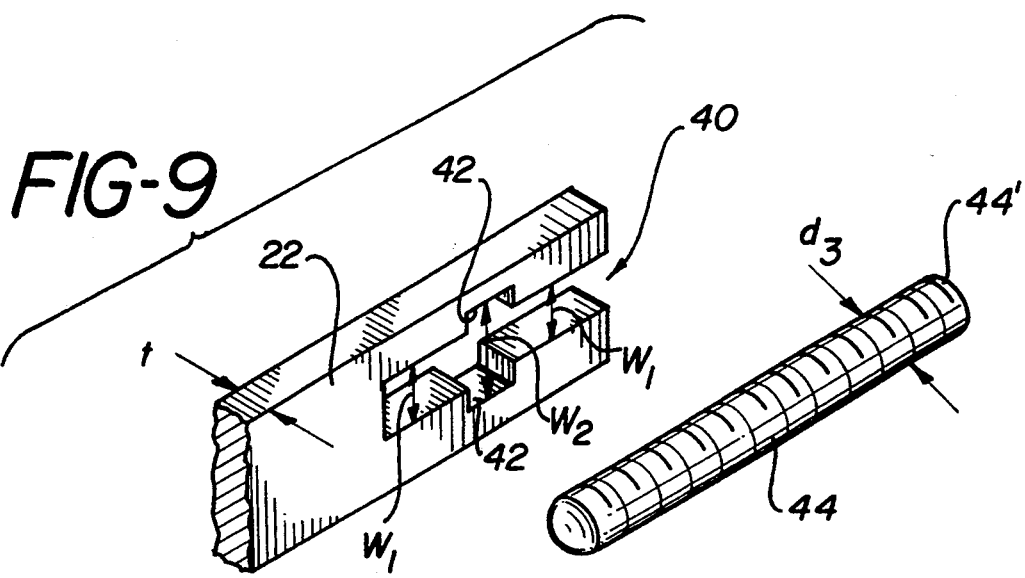
FIG. 9 is a perspective view of an alternative embodiment of the invention with the rod member shown spaced from the tang (fragmented)
Figure 10:
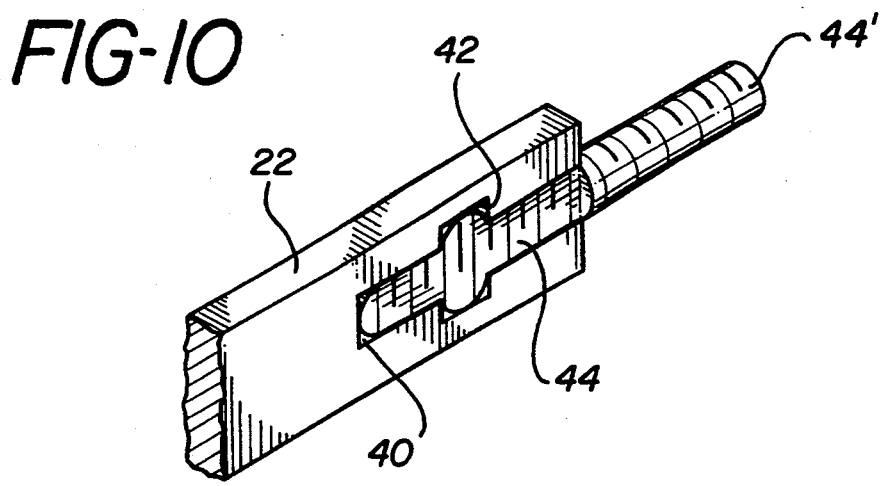
FIG. 10 is the view of FIG. 9 showing the rod member pressed into the notch of the tang in the intended manner.
Figure 11:
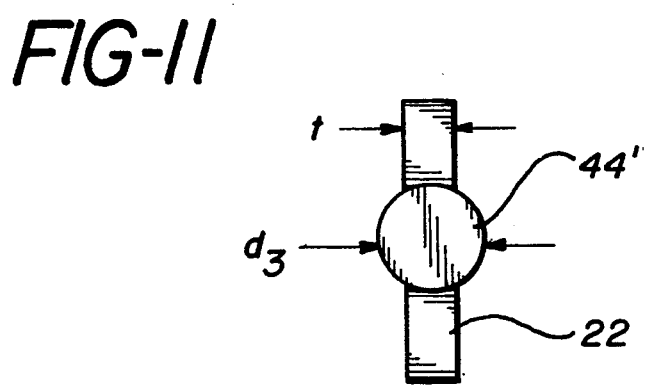
FIG. 11 is an end view of FIG. 10 as seen from the end where the rod member extends from the tang.

Attention is turned to FIGS. 9-11 which show an alternate embodiment of the invention. In particular, tang 22 having a thickness t includes a notch 40 having a central notch portion of width $w_2$ which is larger than the width $w_1$ of the remaining portions of notch 40 on either side thereof. A threaded rod member 44 is provided having a substantially uniform diameter $d_3$ which is slightly less than the width $w_2$ of tang 22 yet larger than the thickness t thereof as seen best in FIG. 11. As with screw 30, rod member 44 is longer than notch 40 such that an end 44' thereof extends rearwardly and exteriorly of notch 40 when inserted therein as indicated in FIG. 9. Following insertion of rod member 44 within notch 40, the pressing operation discussed above is initiated along tang 22 and, since rod member 44 has a diameter $d_3$ larger than the thickness t of tang 22, the portion of rod member within notch 40 laterally expands to approximate thickness t thereby filling central notch portion 42. Since the pressing operation is carried out only upon the portion of rod member 44 within notch 40, the exposed portion 44' thereof remains circular in cross section for the threaded engagement of a securing nut 20 thereto (FIG. 11). It will thus be appreciated that rod member 44 is securely attached to tang 22 in the same manner as screw 30.

At least handle pieces 16 and 14 may be mounted upon tang 22 prior to attachment of screw 30 or rod member 44 to tang end portion 22' by inserting the tang through the apertures in hilt 16 and handle 14 as described previously. It is noted that butt piece 18 must be mounted upon tang 22 after attachment of screw 30 or rod member 44 since butt piece 18 lies in covering relation to both tang proximal end 22' and screw 30 or rod member 44. Securing nut 20 is then threaded onto the terminal end 35 of screw 30 or terminal end 44' of rod member 44 projecting rearwardly into the cooperatively shaped cavity 19 in butt piece 18. Although the knife design of FIG. 1 includes a hilt, handle, butt piece and securing nut, it is understood that many other knife designs are possible using the present apparatus and method.

What is claimed is:

1. A knife construction comprising:
   a) a blade having distal and proximal ends and extending generally along a linear axis;
   b) a tang having a distal end fixedly attached to said blade proximal end, and a proximal end;
   c) a handle piece covering at least a portion of said tang;
   d) a butt piece having a through opening;
   e) a rod having first and second, opposite ends, threaded from at least one of said ends;
   f) a notch extending from an open end into said tang proximal end along said axis, said notch having a laterally enlarged portion spaced from said open end, said rod having a section positioned in said notch, a portion of said section of said threaded rod being flattened and laterally expanded into substantially permanent engagement within said laterally enlarged portion of said notch, said rod threaded end extending rearwardly from said notch in a direction away from said blade, along said axis and through said butt piece opening; and
   g) a nut threadedly secured to said threaded rod end to secure said butt and handle pieces in position in covering relation to said tang.

2. The knife construction according to claim 1 wherein said rod is a screw having head and threaded neck portions and wherein said notch includes respective head and neck portions with said screw neck portion extending between said notch head portion and said open end, said screw head portion and a portion of said threaded neck portion thereto being positioned and engaged within said notch head and neck portions, respectively.

3. The knife construction according to claim 2 wherein at least a portion of said butt piece lies in covering relation to said head portion of said screw.

4. The knife construction according to claim 3 wherein said butt piece lies in covering relation to said screw head portion and said threaded neck portion.

5. The knife construction according to claim 4 wherein said butt piece lies in covering relation to said screw threaded neck portion extending rearwardly of said tang proximal end.

6. A method for attaching a handle in covering relation to an elongated tang of a knife blade, said tang extending along a linear axis and having a distal end which is fixedly connected to a proximal end of said knife blade, said method comprising:
   a) forming a notch in said tang extending substantially along said axis from an open end at a proximal end of said tang said notch having a laterally enlarged portion spaced from said open end;
   b) positioning a deformable, elongated member to extend substantially along said axis with a first portion of said member within said groove, and a second, threaded portion extending longitudinally outwardly from said tang proximal end;
   c) deforming at least part of said first portion of said member to extend into said laterally enlarged portion of said notch, thereby preventing longitudinal movement of said member with respect to said tang;
   d) inserting said tang through a longitudinally extending opening in a handle piece with said second portion of said member extending outwardly from a proximal end of said handle piece;
   e) inserting said second portion of said member through an opening in a butt piece with a terminal part of said second portion accessible within an enlarged portion of said butt piece opening; and
   f) threadedly engaging a nut with said terminal part of said member, thereby securing said handle and butt pieces in fixed relation to said tang.

7. The method of claim 6 wherein said notch is formed with said laterally enlarged portion at the end of said notch opposite said open end.

8. The method of claim 7 wherein said member is a screw having a head and a threaded stem, said head is positioned within said laterally enlarged portion of said notch, and said deforming step is performed on said head.

9. The method of claim 6 wherein said notch is formed with said laterally enlarged portion at intermediate position between said open end and a closed end of said notch.

10. The method of claim 6 wherein said member is a rod of initially uniform diameter over its full length, said diameter being greater than the thickness of said tang, and said deforming step is performed on an intermediate portion of said rod.

* * * * *